(12) United States Patent
Hofmann et al.

(10) Patent No.: US 10,174,151 B2
(45) Date of Patent: Jan. 8, 2019

(54) METHOD FOR PRODUCING POLYETHER CARBONATE POLYOLS

(71) Applicant: Covestro Deutschland AG, Leverkusen (DE)

(72) Inventors: Joerg Hofmann, Krefeld (DE); Norbert Hahn, Rommerskirchen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/436,184

(22) Filed: Feb. 17, 2017

(65) Prior Publication Data

US 2017/0158804 A1 Jun. 8, 2017

Related U.S. Application Data

(63) Continuation of application No. 14/438,905, filed as application No. PCT/EP2013/073157 on Nov. 6, 2013.

(30) Foreign Application Priority Data

Jun. 27, 2013 (EP) ..................... 13174117

(51) Int. Cl.
| | |
|---|---|
| *C08G 18/44* | (2006.01) |
| *C08G 64/34* | (2006.01) |
| *C08G 18/76* | (2006.01) |
| *C08G 18/18* | (2006.01) |
| *C08G 18/20* | (2006.01) |
| *C08G 18/40* | (2006.01) |
| *C08G 18/48* | (2006.01) |
| *C08G 18/08* | (2006.01) |
| *C08G 65/26* | (2006.01) |
| *C08G 65/331* | (2006.01) |
| *C08G 64/02* | (2006.01) |
| *C08G 101/00* | (2006.01) |

(52) U.S. Cl.
CPC .............. *C08G 18/44* (2013.01); *C08G 18/14* (2013.01); *C08G 18/1825* (2013.01); *C08G 18/1833* (2013.01); *C08G 18/2063* (2013.01); *C08G 18/4018* (2013.01); *C08G 18/48* (2013.01); *C08G 18/4816* (2013.01); *C08G 18/7621* (2013.01); *C08G 18/7657* (2013.01); *C08G 18/7671* (2013.01); *C08G 64/0208* (2013.01); *C08G 64/34* (2013.01); *C08G 65/2603* (2013.01); *C08G 65/2606* (2013.01); *C08G 65/2663* (2013.01); *C08G 65/2696* (2013.01); *C08G 65/331* (2013.01); *C08G 2101/005* (2013.01); *C08G 2101/0008* (2013.01); *C08G 2101/0058* (2013.01); *C08G 2101/0083* (2013.01)

(58) Field of Classification Search
CPC .... C08G 18/48; C08G 18/14; C08G 18/7671; C08G 18/2063; C08G 18/4816; C08G 18/4018; C08G 18/7657; C08G 18/7621; C08G 18/1825; C08G 18/1833; C08G 18/44; C08G 65/2606; C08G 65/331; C08G 65/2663; C08G 65/2603; C08G 65/2696; C08G 64/34; C08G 2101/0058; C08G 2101/0083; C08G 2101/0008; C08G 2101/005
See application file for complete search history.

(56) References Cited

U.S. PATENT DOCUMENTS

| | | | | |
|---|---|---|---|---|
| 2009/0306239 | A1* | 12/2009 | Mijolovic | C08G 18/44 521/172 |
| 2013/0190462 | A1* | 7/2013 | Wolf | C08G 65/2603 526/64 |

FOREIGN PATENT DOCUMENTS

WO    WO 2011/101403    *   8/2011

OTHER PUBLICATIONS

Herzberger, et al., Polymerization of Ethylene Oxide, Propylene Oxide, and Other Alkylene Oxides: Synthesis, Novel Polymer Architectures, and Bioconjugation, Chemical Reviews, 2016, 2170-2243, 116, ACS Publications, Washington DC, United States.

* cited by examiner

*Primary Examiner* — John M Cooney
(74) *Attorney, Agent, or Firm* — K&L Gates LLP

(57) ABSTRACT

The present invention relates to a method for producing polyether carbonate polyols, wherein: (i) in a first step, (a) carbon dioxide and propylene oxide or (b) carbon dioxide and a mixture of propylene oxide and at least one further alkylene oxide in a ratio by weight of >90:10 are attached to one or more H-functional starting substances in the presence of at least one DMC catalyst; (ii) in a second step, the reaction mixture obtained from step (i) is (ii-1) first chain-lengthened with a mixture containing propylene oxide (PO) and ethylene oxide (EO) in a PO/EO ratio by weight of 90/10 to 20/80 in the presence of at least one DMC catalyst.

15 Claims, No Drawings

METHOD FOR PRODUCING POLYETHER CARBONATE POLYOLS

CROSS-REFERENCE TO RELATED APPLICATIONS

This patent application is a continuation application and claims the benefit of the filing date under 35 U.S.C. § 120 of co-pending U.S. patent application Ser. No. 14/438,905; U.S. patent application Ser. No. 14/438,905 entered the United States national phase under 35 U.S.C. § 371 on Apr. 28, 2015 from International Patent Application No. PCT/EP2013/073157, which was filed on Nov. 6, 2013; International Patent Application No. PCT/EP2013/073157 claims priority to European Patent Application No. EP 13174117.5, which was filed on Jun. 27, 2013, the contents of each of which are incorporated by reference into this specification.

BACKGROUND

Field of the Invention

The present invention relates to a process for preparing polyether carbonate polyols, to the polyether carbonate polyols obtainable by this process and to the processing thereof for production of flexible polyurethane foams.

Description of Related Art

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is environmentally very advantageous, since this reaction constitutes the conversion of a greenhouse gas such as $CO_2$ to a polymer. A further product, actually a by-product, formed here is the cyclic carbonate shown in scheme (I) (for example, when $R=CH_3$, propylene carbonate).

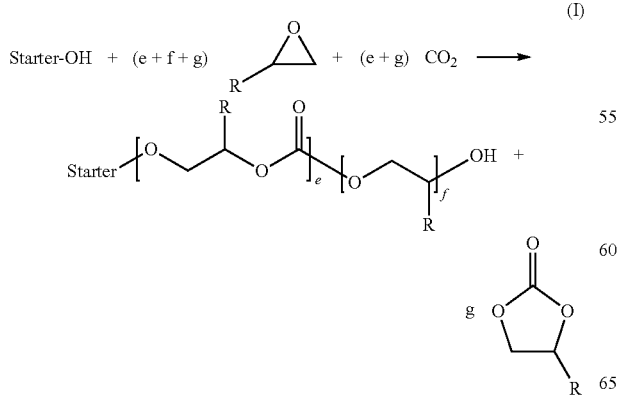

WO-A 2004/111107 discloses a process for preparing polyether polyols having terminal ethylene oxide chains with DMC catalysis, in which catalyst activation with propylene oxide is followed by metered addition of a mixture of propylene oxide and ethylene oxide with a constantly rising proportion of ethylene oxide ("ramping"), then depletion of the residual monomer and finally addition of pure ethylene oxide.

WO-A 2001/044347 discloses a process for DMC-catalyzed preparation of polyether polyols, in which at least two different epoxides are metered in together, with alteration of the ratio of the epoxides to one another in the mixture during the common metered addition.

WO-A 2008/058913 discloses a process for producing flexible polyurethane foams using polyether carbonate polyols prepared by means of DMC catalysis, wherein the polyether carbonate polyols preferably have a block of pure alkylene oxide units, especially pure propylene oxide units, at the chain end.

European patent application No. 11168433.8 discloses a process for DMC-catalyzed preparation of polyether carbonate polyols having a mixed block composed of at least two different alkylene oxides in a molar ratio of 15/85 to 60/40, and flexible polyurethane foams obtainable therefrom.

The polyether carbonate polyols known from the prior art have the disadvantage that, in the event of a (partial) exchange of a polyether polyol for a polyether carbonate polyol in a polyol formulation, the further constituents of the polyol formulation (additives) have to be adjusted in terms of type and/or amount for the processing to give flexible polyurethane foams, in order to achieve impeccable processibility. This is observed especially in the case of processing of the polyether carbonate polyols to give flexible polyurethane foams of the cold foam type (also referred to as high resilience or HR foam). However, it is desirable to be able to replace the polyether polyol at least partly with a polyether carbonate polyol while retaining the good processibility without having to adjust the further constituents of the polyol formulation (additives) in terms of type and/or amount.

SUMMARY

It was therefore an object of the present invention to provide a process for producing polyether carbonate polyols having a minimum polydispersity and good processibility to give flexible polyurethane foams, especially to give flexible polyurethane foams of the cold foam type.

It has been found that, surprisingly, the object of the invention is achieved by a process for preparing polyether carbonate polyols, characterized in that
  (i) in a first step
    (a) carbon dioxide and propylene oxide or
    (b) carbon dioxide and a mixture of propylene oxide and at least one further alkylene oxide in a weight ratio of >90:10, preferably 91:9 to 99.9:0.1,
    are added onto one or more H-functional starter substance(s) in the presence of at least one DMC catalyst,
  (ii) in a second step the reaction mixture obtained from step (i)
    (ii-1) is first chain-extended with a mixture comprising propylene oxide (PO) and ethylene oxide (EO) in a PO/EO weight ratio of 90/10 to 20/80, preferably of 80/20 to 30/70, more preferably of 75/25 to 35/65, in the presence of at least one DMC catalyst, where it is also possible to effect step (ii-1) repeatedly with different PO/EO weight ratios in each case,
(ii-2) then the resulting mixture is chain-extended with a mixture comprising propylene oxide (PO) and ethylene oxide (EO) in a PO/EO weight ratio of 60/40 to 2/98, preferably of 40/60 to 5/95, more preferably of 30/70 to 10/90, in the presence of at least one DMC catalyst, where it is also possible to effect step (ii-2) repeatedly with different PO/EO weight ratios in each case, and
(iii) the polyether carbonate polyol resulting from step (ii) is chain-extended with ethylene oxide or a mixture of propylene oxide (PO) and ethylene oxide (EO) in a PO/EO weight ratio of 5/95 to 0.1/99.9, preferably ethylene oxide, in the presence of at least one DMC catalyst,
where the proportion by weight of EO in the mixture comprising PO and EO in step (ii-2) is higher than the proportion by weight of EO in the mixture comprising PO and EO in step (ii-1).

DETAILED DESCRIPTION OF A PREFERRED EMBODIMENT

The present invention further provides a process for producing flexible polyurethane foams, wherein the starting material used is a polyol component (component A) comprising a polyether carbonate polyol obtainable by a process, characterized in that
(i) in a first step
  (a) carbon dioxide and propylene oxide or
  (b) carbon dioxide and a mixture of propylene oxide and at least one further alkylene oxide in a weight ratio of >90:10, preferably 91:9 to 99.9:0.1,
  are added onto one or more H-functional starter substance(s) in the presence of at least one DMC catalyst,
(ii) in a second step the reaction mixture obtained from step (i)
  (ii-1) is first chain-extended with a mixture comprising propylene oxide (PO) and ethylene oxide (EO) in a PO/EO weight ratio of 90/10 to 20/80, preferably of 80/20 to 30/70, more preferably of 75/25 to 35/65, in the presence of at least one DMC catalyst, where it is also possible to effect step (ii-1) repeatedly with different PO/EO weight ratios in each case,
  (ii-2) then the resulting mixture is chain-extended with a mixture comprising propylene oxide (PO) and ethylene oxide (EO) in a PO/EO weight ratio of 60/40 to 2/98, preferably of 40/60 to 5/95, more preferably of 30/70 to 10/90, in the presence of at least one DMC catalyst, where it is also possible to effect step (ii-2) repeatedly with different PO/EO weight ratios in each case,
(iii) the polyether carbonate polyol resulting from step (ii) is chain-extended with ethylene oxide or a mixture of propylene oxide (PO) and ethylene oxide (EO) in a PO/EO weight ratio of 5/95 to 0.1/99.9, preferably ethylene oxide, in the presence of at least one DMC catalyst,
where the proportion by weight of EO in the mixture comprising PO and EO in step (ii-2) is higher than the proportion by weight of EO in the mixture comprising PO and EO in step (ii-1).

The inventive flexible polyurethane foams preferably have an apparent density to DIN EN ISO 3386-1-98 in the range from ≥10 kg/m3 to ≤150 kg/m$^3$, preferably of ≥20 kg/m$^3$ to ≤70 kg/m$^3$, and the indentation hardness thereof to DIN EN ISO 3386-1-98 is preferably in the range from ≥0.5 kPa to ≤20 kPa (at 40% deformation and 4th cycle).

Step (i):

The addition of the one or more alkylene oxides and carbon dioxide in the presence of at least one DMC catalyst onto one or more H-functional starter substance(s) ("copolymerization") leads to a reaction mixture comprising the polyether carbonate polyol and possibly cyclic carbonate (cf. scheme (I); for example, in the case of addition of propylene oxide (R=CH$_3$), the result is thus propylene carbonate).

For example, the process in step (i) is characterized in that
(α) the H-functional starter substance or a mixture of at least two H-functional starter substances or a suspension medium is initially charged and any water and/or other volatile compounds are removed by elevated temperature and/or reduced pressure ("drying"), with addition of the DMC catalyst to the H-functional starter substance or to the mixture of at least two H-functional starter substances or the suspension medium before or after the drying,
(β) activation is accomplished by adding a portion (based on the total amount of the amount of alkylene oxides used in the activation and copolymerization) of alkylene oxide selected from the group consisting of
  (a) propylene oxide and
  (b) a mixture of propylene oxide and at least one further alkylene oxide in a weight ratio of ≥90:10, preferably 91:9 to 99.9:0.1,
  to the mixture resulting from step (α), it being possible for this addition of a portion of alkylene oxide to be effected in the optional presence of CO$_2$, in which case the temperature peak ("hotspot") which occurs because of the exothermic chemical reaction that follows and/or a pressure drop in the reactor is awaited, and where step (β) for activation can also be effected repeatedly,
(γ) propylene oxide or a mixture of propylene oxide and at least one further alkylene oxide in a weight ratio of ≥90:10, preferably 91:9 to 99.9:0.1, carbon dioxide and optionally one or more H-functional starter substance(s) are added to the mixture resulting from step (β), where the alkylene oxides used in step (γ) may be the same as or different than the alkylene oxides used in step (β),
where at least one H-functional starter substance is added in at least one of steps (α) and (γ).

Any suspension media used do not contain any H-functional groups. Suitable suspension media are all polar aprotic, weakly polar aprotic and nonpolar aprotic solvents, none of which contain any H-functional groups. The suspension medium used may also be a mixture of two or more of these suspension media. The following polar aprotic suspension media are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic suspension media includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In general, for the process according to the invention, in step (i), it is possible to use (a) propylene oxide or (b) a mixture of propylene oxide and at least one further alkylene oxide in a weight ratio of ≥90:10, preferably 91:9 to 99.9:0.1. Alkylene oxides (epoxides) usable in the mixture with propylene oxide are those having 2-24 carbon atoms. The alkylene oxides having 2-24 carbon atoms are, for example, one or more compounds selected from the group consisting of ethylene oxide, 1-butene oxide, 2,3-butene oxide, 2-methyl-t,2-propene oxide (isobutene oxide), 1-pentene oxide, 2,3-pentene oxide, 2-methyl-i,2-butene oxide, 3-methyl-i,2-butene oxide, 1-hexene oxide, 2,3-hexene oxide, 3,4-hexene oxide, 2-methyl-i,2-pentene oxide, 4-methyl-1,2-pentene oxide, 2-ethyl-i,2-butene oxide, 1-heptene oxide, 1-octene oxide, 1-nonene oxide, 1-decene oxide, 1-undecene oxide, 1-dodecene oxide, 4-methyl-i,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, ally' glycidyl ether, glycidyl methacrylate and epoxy-functional alkyloxysilanes, for example 3-glycidyloxypropyltrimethoxy silane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preference is given to using, in step (i), propylene oxide or a mixture of propylene oxide and 1-butene oxide in a weight ratio of >90:10, more preferably 91:9 to 99.9:0.1; in particular, pure propylene oxide is used.

Suitable H-functional starter substances ("starters") used may be compounds having hydrogen atoms active in respect of the alkoxylation and having a molar mass of 18 to 4500 g/mol, preferably of 60 to 500 g/mol and more preferably of 62 to 182 g/mol. The ability to use a starter having a low molar mass is a distinct advantage over the use of oligomeric starters prepared by means of a prior alkoxylation. More particularly, economic viability is achieved, which is enabled by the omission of a separate alkoxylation process.

Groups which have active hydrogen atoms and are active in respect of the alkoxylation are, for example, —OH, —NH$_2$ (primary amines), —NH— (secondary amines), —SH and —CO$_2$H, preferably —OH and —NH$_2$, especially preferably —OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of castor oil, monoglycerides of fatty acids, chemically modified mono-, di- and/or triglycerides of fatty acids, and $C^1$-$C^{24}$ alkyl fatty acid esters containing an average of at least 2 OH groups per molecule. By way of example the $C^1$-$C^{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®TM products (from USSC Co.).

The mono-H-functional starter substances used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of E-caprolactone.

The H-functional starter substances may also be selected from the substance class of the polyether polyols having a molecular weight Mn in the range from 18 to 4500 g/mol and a functionality of 2 to 3. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide.

The H-functional starter substances may also be selected from the substance class of the polyester polyols. The polyester polyols used are at least difunctional polyesters. Preferably, polyester polyols consist of alternating acid and alcohol units. The acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned.

The alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols.

In addition, H-functional starter substances used may be polycarbonate diols which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177.

In a further embodiment of the invention, it is possible to use polyether carbonate polyols as H-functional starter substances. More particularly, polyether carbonate polyols obtainable by the process step (i) described here are used. For this purpose, these polyether carbonate polyols used as H-functional starter substances are prepared in a separate reaction step beforehand.

The H-functional starter substances generally have a functionality (i.e. the number of hydrogen atoms active in respect of the polymerization per molecule) of 1 to 8, preferably of 2 or 3. The H-functional starter substances are used either individually or as a mixture of at least two H-functional starter substances.

More preferably, the H-functional starter substances are one or more compounds selected from the group consisting of ethylene glycol, propylene glycol, propane-1,3-diol, butane-1,3-diol, butane-i,4-diol, pentane-1,5-diol, 2-methylpropane-i,3-diol, neopentyl glycol, hexane-i,6-diol, octane-1,8-diol, diethylene glycol, dipropylene glycol, glycerol, trimethylolpropane, pentaerythritol, sorbitol and polyether polyols having a molecular weight Mn in the range from 150 to 4500 g/mol and a functionality of 2 to 3.

The polyether carbonate polyols are prepared by catalytic addition of carbon dioxide and alkylene oxides onto H-functional starter substances. In the context of the invention, "H-functional" is understood to mean the number of hydrogen atoms active in respect of the alkoxylation per molecule of the starter substance.

Step (α):

Preferably, in step (α), a suspension medium not containing any H-functional groups is initially charged in the reactor, optionally together with DMC catalyst, and no H-functional starter substance is initially charged in the reactor at this time. Alternatively, it is also possible in step (α) to initially charge a suspension medium not containing any H-functional groups and additionally a portion of the H-functional starter substance(s) and optionally DMC catalyst in the reactor, or it is also possible in step (α) to initially charge a portion of the H-functional starter substance(s) and optionally DMC catalyst in the reactor. In addition, it is also possible in step (α) to initially charge the total amount of the H-functional starter substance(s) and optionally DMC catalyst in the reactor.

The DMC catalyst is preferably used in such an amount that the content of DMC catalyst in the reaction product that results from step (i) is 10 to 10 000 ppm, especially preferably 20 to 5000 ppm and most preferably 50 to 500 ppm.

In a preferred embodiment, inert gas (for example argon or nitrogen), an inert gas/carbon dioxide mixture or carbon dioxide is introduced into the resulting mixture of DMC catalyst with suspension medium and/or H-functional starter substance at a temperature of 90 to 150° C., more preferably of 100 to 140° C., and at the same time a reduced pressure (absolute) of 10 mbar to 800 mbar, more preferably of 50 mbar to 200 mbar, is applied.

In an alternative preferred embodiment, the resulting mixture of DMC catalyst with suspension medium and/or H-functional starter substance at a temperature of 90 to 150° C., more preferably of 100 to 140° C., is contacted at least once, preferably three times, with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added, for example, in solid form or as a suspension in a suspension medium or a plurality of suspension media or as a suspension in one or more H-functional starter substance(s).

In a further embodiment, in step (α), (α-I) suspension medium and/or a portion or the total amount of H-functional starter substance is initially charged and (α-II) the temperature of the suspension medium and/or the H-functional starter substance is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example of argon or nitrogen), an inert gas/carbon dioxide stream or a carbon dioxide stream is optionally passed through the reactor, where the double metal cyanide catalyst is added to the suspension medium and/or to the H-functional starter substance (α-I) or immediately thereafter in step (α-II), and where the suspension medium does not contain any H-functional groups.

Step (β):

Step (β) serves to activate the DMC catalyst. This step can optionally be conducted under inert gas atmosphere, under an atmosphere of inert gas/carbon dioxide mixture or under a carbon dioxide atmosphere. In the context of this invention, activation refers to a step in which a portion of alkylene oxide compound selected from the group consisting of (a) propylene oxide and (b) a mixture of propylene oxide and at least one further alkylene oxide in a weight ratio of ≥90:10, preferably 91:9 to 99.9:0.1, is added at temperatures of 90 to 150° C. to the DMC catalyst suspension, and then the addition of the alkylene oxide compound is stopped, where evolution of heat which can lead to a temperature peak ("hotspot") is observed because of an exothermic chemical reaction which follows, as is a pressure drop in the reactor because of the reaction of alkylene oxide and any CO2. The process step of activation is the period from the addition of the portion of alkylene oxide compound, optionally in the presence of CO2, to the DMC catalyst until the occurrence of the evolution of heat. Optionally, the portion of alkylene oxide compound can be added to the DMC catalyst in a plurality of individual steps, optionally in the presence of CO2, and then the addition of the alkylene oxide compound can be stopped in each case. In this case, the process step of activation comprises the period from the addition of the first portion of alkylene oxide compound, optionally in the presence of CO2, to the DMC catalyst until the occurrence of the evolution of heat after addition of the last portion of alkylene oxide compound. In general, the activation step may be preceded by a step for drying the DMC catalyst and optionally the H-functional starter substance at elevated temperature and/or reduced pressure, optionally with passage of an inert gas through the reaction mixture.

The one or more alkylene oxides (and optionally the carbon dioxide) can in principle be metered in in different ways. The commencement of the metered addition can be effected from vacuum or at a previously chosen supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and especially preferably 20 mbar to 50 bar.

In a preferred embodiment, the amount of one or more alkylene oxides used in the activation in step ($\beta$) is 0.1 to 25.0% by weight, preferably 1.0 to 20.0% by weight, especially preferably 2.0 to 16.0% by weight (based on the amount of suspension medium and/or H-functional starter substance used in step ($\alpha$)). The alkylene oxide can be added in one step or in two or more portions. Preferably, after addition of a portion of alkylene oxide compound, the addition of the alkylene oxide compound is stopped until the occurrence of evolution of heat and only then is the next portion of alkylene oxide compound added. Preference is also given to a two-stage activation (step ($\beta$), where ($\beta$1) in a first activation stage a first portion of alkylene oxide is added under inert gas atmosphere and ($\beta$2) in a second activation stage a second portion of alkylene oxide is added under carbon dioxide atmosphere.

Step ($\gamma$):

For the process according to the invention, it has been found that step ($\gamma$) is advantageously conducted at 50 to 150° C., preferably at 60 to 145° C., more preferably at 70 to 140° C. and most preferably at 90 to 130° C. Below 50° C., the reaction to form a polyether carbonate polyol proceeds only very gradually. At temperatures above 150° C., the amount of unwanted byproducts rises significantly.

The metered addition of the alkylene oxides selected from the group consisting of (a) propylene oxide and (b) a mixture of propylene oxide and at least one further alkylene oxide in a weight ratio of >90:10, preferably 91:9 to 99.9:0.1, and of the carbon dioxide can be effected simultaneously, alternately or sequentially, it being possible to add the total amount of carbon dioxide all at once or by metered addition over the reaction time. It is possible, during the addition of the alkylene oxide, to increase or lower the $CO_2$ pressure gradually or stepwise or to leave it constant. Preferably, the total pressure is kept constant during the reaction by metered addition of further carbon dioxide. The metered addition of one or more alkylene oxides and/or the $CO_2$ is effected simultaneously, alternately or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. It is possible via the manner and/or sequence of the metered addition of the alkylene oxides and/or the carbon dioxide to synthesize random, alternating, block or gradient polyether carbonate polyols.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, more preferably from 1 to 100 bar. It is possible to feed in the carbon dioxide continuously or discontinuously. This depends on how quickly the alkylene oxides and the $CO_2$ are consumed and whether the product is supposed to contain any $CO_2$-free polyether blocks or blocks having different $CO_2$ content. The amount of the carbon dioxide (reported as pressure) can likewise vary in the course of addition of the alkylene oxides. According to the reaction conditions selected, it is possible to introduce the $CO_2$ into the reactor in the gaseous, liquid or supercritical state. $CO_2$ can also be added to the reactor in solid form and then be converted under the selected reaction conditions to the gaseous, dissolved, liquid and/or supercritical state.

In a process comprising metered addition of one or more H-functional starter substance(s) in step ($\gamma$), the metered addition of one or more H-functional starter substance(s), one or more alkylene oxide(s) and optionally also of the carbon dioxide can be effected simultaneously or sequentially (in portions); for example, it is possible to add the total amount of carbon dioxide, the amount of H-functional starter substances and/or the amount of alkylene oxides metered in in step ($\gamma$) all at once or continuously. The term "continuously" used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the H-functional starter substances, to increase or lower the $CO_2$ pressure gradually or stepwise or to leave it constant. Preferably, the total pressure is kept constant during the reaction by metered addition of further carbon dioxide. The metered addition of one or more alkylene oxide(s) and/or the one or more H-functional starter substance(s) is effected simultaneously or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides and/or of the H-functional starter substances can be effected simultaneously or sequentially, each via separate metering points (addition points), or via one or more metering points, in which case the alkylene oxides and/or the H-functional starter substances can be metered in individually or as a mixture. It is possible via the manner and/or sequence of the metered addition of the H-functional starter substances, the alkylene oxides and/or the carbon dioxide to synthesize random, alternating, block or gradient polyether carbonate polyols.

In a preferred embodiment, in step ($\gamma$), the metered addition of the one or more H-functional starter substance(s) is ended at a juncture prior to the addition of the alkylene oxide.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, more preferably from 1 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ can also be added to the reactor in solid form and then be converted under the selected reaction conditions to the gaseous, dissolved, liquid and/or supercritical state.

One characteristic feature of a preferred embodiment of the process according to the invention is that, in step ($\gamma$), the total amount of the one or more H-functional starter substance(s) is added, i.e. a suspension medium is used in step ($\alpha$). This addition can be effected at a constant metering rate, at a varying metering rate or in portions.

Preferably, the polyether carbonate polyols are prepared in a continuous process which comprises either a continuous copolymerization or a continuous addition of the one or more H-functional starter substance(s). The invention therefore also provides a process wherein, in step ($\gamma$), one or more H-functional starter substance(s), one or more alkylene oxide(s) and DMC catalyst are metered continuously into the reactor in the presence of carbon dioxide ("copolymerization"), and wherein the resulting reaction mixture (comprising the reaction product) is removed continuously from the reactor. Preferably, in step ($\gamma$), the DMC catalyst which has been suspended in H-functional starter substance is added continuously. The metered addition of the alkylene oxide, the H-functional starter substance and the DMC catalyst can be effected via separate or combined metering points. In a preferred embodiment, the alkylene oxide and the H-functional starter substance are metered continuously into the reaction mixture via separate metering points. This addition of the one or more H-functional starter substance(s) can be effected as a continuous metered addition into the reactor or in portions.

For example, for the continuous process for preparing the polyether carbonate polyols in steps ($\alpha$) and ($\beta$), an activated DMC catalyst/suspension medium mixture is prepared, then, in step ($\gamma$), ($\gamma$1) a portion each of one or more H-functional starter substance(s), one or more alkylene oxide(s) and carbon dioxide are metered in to initiate the copolymerization, and ($\gamma$2) during the progress of the copolymerization, the remaining amount of each of DMC catalyst, one or more starter substance(s) and alkylene oxide(s) is metered in continuously, with simultaneous removal of resulting reaction mixture continuously from the reactor.

In step ($\gamma$), the DMC catalyst is preferably added suspended in the H-functional starter substance.

Steps ($\alpha$), ($\beta$) and ($\gamma$) can be performed in the same reactor, or each can be performed separately in different reactors. Particularly preferred reactor types are: tubular reactors, stirred tanks, loop reactors.

Steps ($\alpha$), ($\beta$) and ($\gamma$) can be performed in a stirred tank, in which case the stirred tank, according to the design and mode of operation, is cooled via the reactor shell, internal cooling surfaces and/or cooling surfaces within a pumped circulation system. Both in the semi-batchwise process, in which the product is withdrawn only after the reaction has ended, and in the continuous process, in which the product is withdrawn continuously, particular attention should be paid to the metering rate of the alkylene oxide. This should be set such that, in spite of the inhibiting action of the carbon dioxide, the alkylene oxides are depleted quickly enough.

In a preferred embodiment, the mixture comprising the activated DMC catalyst that results from steps ($\alpha$) and ($\beta$) is reacted further in the same reactor with one or more alkylene oxide(s), one or more starter substance(s) and carbon dioxide. In a further preferred embodiment, the mixture comprising the activated DMC catalyst that results from steps ($\alpha$) and ($\beta$) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising the activated DMC catalyst that results from steps ($\alpha$) and ($\beta$), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. Advantageously, mixing elements for better mixing of the co-reactants are installed, as sold, for example, by Ehrfeld Mikrotechnik BTS GmbH, or mixer-heat exchanger elements which simultaneously improve the mixing and heat removal.

Loop reactors can likewise be used for performance of steps ($\alpha$), ($\beta$) and ($\gamma$). These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a jet loop reactor is advantageous especially because backmixing can be achieved here, such that it is possible to keep the concentration of free alkylene oxides in the reaction mixture within the optimal range, preferably in the range from $\geq 0\%$ to 40% by weight, more preferably >0% to 25% by weight, most preferably >0% to 15% by weight (based in each case on the weight of the reaction mixture).

Preferably, steps ($\alpha$) and ($\beta$) are conducted in a first reactor, and the resulting reaction mixture is then transferred into a second reactor for the copolymerization in step ($\gamma$). However, it is also possible to conduct steps ($\alpha$), ($\beta$) and ($\gamma$) in one reactor.

The process in step (i) can also be conducted in such a way that a DMC catalyst activated in a suspension medium in steps ($\alpha$) and ($\beta$) is used at first, and the DMC catalyst is added without prior activation during the copolymerization ($\gamma$). A particularly advantageous feature of the preferred embodiment of the present invention is thus the ability to use "fresh" DMC catalysts without activation of a portion of DMC catalyst which is added continuously in step ($\gamma$). An activation of DMC catalysts to be conducted analogously to step ($\beta$) does not just involve additional attention from the operator, which results in an increase in the manufacturing costs, but also requires a pressurized reaction vessel, which also results in an increase in the capital costs in the construction of a corresponding production plant. Here, "fresh" DMC catalyst is defined as unactivated DMC catalyst in solid form or in the form of a slurry in a starter substance or suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in in a truly continuous manner or in relatively closely spaced increments. Equally, a continuous addition of starter can be effected in a truly continuous manner or in increments. There would be no departure from the present process in adding a DMC catalyst or reactant incrementally such that the concentration of the materials added drops essentially to zero for a period of time before the next incremental addition. However, it is preferable that the DMC catalyst concentration is kept essentially at the same concentration during the main portion of the course of the continuous reaction, and that starter substance is present during the main portion of the copolymerization process. An incremental addition of DMC catalyst and/or reactant which essentially does not affect the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

Optionally, volatile constituents (for example residual amounts of alkylene oxides, by-products or suspension media) are removed from the reaction mixture that results from step (i), for example by distillation under reduced pressure or by thin-film evaporation.

Step (ii):

For example, steps (ii-1) and/or (ii-2) can be repeated two to ten times, in which case, in a preferred embodiment, a mixture comprising propylene oxide (PO) and ethylene oxide (EO) is used, with an increase in the proportion by weight of EO on each repetition. In a particularly preferred embodiment of the invention, the proportion by weight of EO in the mixture of PO and EO is increased continuously between a starting PO/EO mixing ratio and a final PO/EO mixing ratio, the starting PO/EO mixing ratio corresponding to a PO/EO weight ratio from the weight ratio defined for step (ii-1), and the final PO/EO mixing ratio corresponding to a PO/EO weight ratio from the weight ratio defined for step (ii-2).

The mean length of the mixed blocks of PO and EO produced in step (ii-1) or (ii-2) is preferably 1.0 to 20.0 alkylene oxide units, more preferably 1.5 to 10.0 alkylene oxide units, based in each case on one OH group of the polyether carbonate polyol.

Optionally, for performance of step (ii), inert gas (for example argon or nitrogen) is introduced into the mixture that results from step (i) at a temperature of 90 to 150° C., more preferably of 100 to 140° C., and simultaneously a reduced pressure is applied (in absolute terms), so as to establish a pressure in the reactor of 10 mbar to 800 mbar, more preferably of 50 mbar to 200 mbar (also referred to hereinafter as "stripping").

Optionally, step (ii) can be performed by adding DMC catalyst to the reaction mixture obtained from step (i). Alternatively, step (ii) can also be performed only with the DMC catalyst present in the mixture from step (i).

For performance of step (ii), a solvent not containing any H-functional groups can be added to the reaction mixture obtained from step (i).

Suitable solvents are preferably all polar aprotic, weakly polar aprotic and nonpolar aprotic solvents, none of which contain any H-functional groups. The solvent used may also be a mixture of two or more of these solvents. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred solvents are 4-methyl-2-oxo-1,3-dioxolane, 1,3-dioxolan-2-one, toluene, xylene, ethylbenzene, chlorobenzene and dichlorobenzene, and mixtures of two or more of these solvents; particular preference is given to 4-methyl-2-oxo-1,3-dioxolane and 1,3-dioxolan-2-one or a mixture of 4-methyl-2-oxo¬1,3-dioxolane and 1,3-dioxolan-2-one.

Step (iii):

Optionally, step (iii) can be performed by adding DMC catalyst to the reaction mixture obtained from step (ii). Alternatively, step (iii) can also be performed only with the DMC catalyst present in the mixture from step (ii).

For performance of step (iii), a solvent not containing any H-functional groups can be added to the reaction mixture obtained from step (ii). Suitable solvents are the solvents mentioned in step (ii).

The metered addition of the ethylene oxide or the mixture of ethylene oxide and propylene oxide may be followed by a step for further reaction, which serves to substantially deplete the alkylene oxides.

Preferably, volatile constituents (for example residual amounts of alkylene oxides, by-products or solvents) are removed from the reaction mixture that results from step (iii), for example by distillation under reduced pressure or by thin-film evaporation.

Preferably, the polyether carbonate polyols that result after step (iii) have a proportion of primary OH groups of 40 to 90 mol %, more preferably 45 to 85 mol %.

The mean length of an alkylene oxide block produced in step (iii) is preferably 1 to 30 alkylene oxide units, more preferably 1.5 to 18 alkylene oxide units, based in each case on one OH group of the polyether carbonate polyol.

Preferably, the polyether carbonate polyols that result after step (iii) have a hydroxyl number of 20 mg KOH/g to 80 mg KOH/g, more preferably of 25 mg KOH/g to 60 mg KOH/g.

For steps (ii) and (iii), it has been found that these are advantageously conducted at 50 to 170° C., preferably at 70 to 150° C., more preferably at 90 to 140° C. and most preferably at 100 to 130° C.

Steps (ii) and (iii) can be performed in the same reactor, or each can be performed separately in different reactors. Preferred reactor types are: tubular reactors, stirred tanks, loop reactors. Steps (ii) and (iii) are more preferably performed in a stirred tank, in which case the product is withdrawn from the stirred tank after the reaction in step (iii) has ended (semi-batchwise process). Most preferably, the stirred tank, according to the design and mode of operation, is cooled via the reactor shell, internal cooling surfaces and/or cooling surfaces within a pumped circulation system.

DMC catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is generally not required. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The inventive DMC catalysts are preferably obtained by
(a) in the first step reacting an aqueous solution of a metal salt with the aqueous solution of a metal cyanide salt in the presence of one or more organic complex ligands, for example of an ether or alcohol,
(b) with removal in the second step of the solid from the suspension obtained from (i) by known techniques (such as centrifugation or filtration),
(ci) with optional washing in a third step of the isolated solid with an aqueous solution of an organic complex ligand (for example by resuspending and optionally reisolating by filtration or centrifugation),
(d) with subsequent drying of the solid obtained, optionally after pulverization, at temperatures of generally 20-120° C. and at pressures of generally 0.1 mbar to standard pressure (1013 mbar),
and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds present in the inventive DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (II)

$$M(X)_n \qquad (II)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$ X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; n is 1 when X=sulfate, carbonate or oxalate and n is 2 when X=halide, hydroxide, carboxylate, cyanate, thiocyanate, isocyanate, isothiocyanate or nitrate,
or suitable metal salts have the general formula (III)

$$M_r(X)_3 \qquad (III)$$

where
M is selected from the metal cations $Fe^{3+}$, $Al^{3+}$, $Co^{3+}$ and $Cr^{3+}$ X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (IV)

$$M(X)_s \qquad (IV)$$

where
M is selected from the metal cations $Mo^{4+}$, $V^{4+}$ and $W^{4+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (V)

$$M(X)_t \qquad (V)$$

where
M is selected from the metal cations $Mo^{6+}$ and $W^{6+}$
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate; t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \qquad (VI)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^{+}$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and a, b and c are integers, where the values of a, b and c are chosen so as to give electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobalte (III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (VII)

$$M_x[M'_{x'}(CN)_y]_z \qquad (VII)$$

in which M is as defined in formula (II) to (V) and
M' is as defined in formula (VI), and
x, x', y and z are integer values and are chosen so as to give electronic neutrality of the double metal cyanide compound.

Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-ibutanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the inventive DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds, are used.

Preferably, in the preparation of the inventive DMC catalysts, in the first step, the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and the metal cyanide salt (e.g. potassium hexacyanocobaltate) are converted in the presence of the organic complex ligand (e.g. tert-butanol), forming a suspension comprising the double metal cyanide compound (e.g. zinc hexacyanocobaltate), water, excess metal salt, and the organic complex ligands.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40 and 80% by weight, based on the overall solution.

Optionally, in the third step, further complex-forming component is added to the aqueous wash solution, preferably in the range between 0.5 and 5% by weight, based on the overall solution.

Moreover, it is advantageous to wash the isolated solid more than once. Preferably, in a first wash step (iii-1), an aqueous solution of the unsaturated alcohol is used for washing (for example by resuspension and subsequent reisolation by filtration or centrifugation), in order to remove, for example, water-soluble by-products such as potassium chloride from the inventive catalyst in this way. Especially preferably, the amount of the unsaturated alcohol in the aqueous wash solution is between 40 and 80% by weight, based on the overall solution in the first wash step. In the further wash steps (iii-2), either the first wash step is repeated once or more than once, preferably once to three times, or, preferably, a nonaqueous solution, for example a mixture or solution of unsaturated alcohol and further complex-forming components (preferably in the range between 0.5 and 5% by weight, based on the total amount of the wash solution in step (iii-2)), is used as a wash solution to wash the solid once or more than once, preferably once to three times.

The isolated and optionally washed solid is subsequently, optionally after pulverization, dried at temperatures of generally 20-100° C. and at pressures of generally 0.1 mbar to standard pressure (1013 mbar).

A preferred process for isolating the inventive DMC catalysts from the suspension by filtration, filtercake washing and drying is described in WO-A 01/80994.

The polyether carbonate polyols obtainable by the process according to the invention have a low content of by-products and can be processed without any problem, especially by reaction with di- and/or polyisocyanates to give polyurethanes, especially flexible polyurethane foams. For polyurethane applications, it is preferable to use polyether carbonate polyols based on an H-functional starter substance having a functionality of at least 2. In addition, the polyether carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain material properties, for example molecular weight, viscosity, functionality and/or hydroxyl number.

Flexible Polyurethane Foams

The invention preferably provides a process for producing flexible polyurethane foams having an apparent density to DIN EN ISO 3386-1-98 in the range from $\geq 10$ kg/n$^3$ to $\leq 150$ kg/n$^3$, preferably from $\geq 20$ kg/n$^3$ to $\leq 70$ kg/n$^3$, and an indentation hardness to DIN EN ISO 3386-1-98 in the range from $\geq 0.5$ kPa to $\leq 20$ kPa (at 40% deformation and 4th cycle), by reaction of component A (polyol formulation) comprising A1 100 to 10 parts by weight, preferably 100 to 50 parts by weight, more preferably 100 parts by weight (based on the sum total of the parts by weight of components A1 and A2), of polyether carbonate polyol obtainable by the process of the present invention, A2 0 to 90 parts by weight, preferably 0 to 50 parts by weight (based on the sum total of the parts by weight of components A1 and A2), of conventional polyether polyol; more preferably, component A is free of conventional polyether polyol, A3 0.5 to 25 parts by weight, preferably 2 to 5 parts by weight (based on the sum total of the parts by weight of components A1 and A2), of water and/or physical blowing agents, A4 0.05 to 10 parts by weight, preferably 0.2 to 4 parts by weight (based on the sum total of the parts by weight of components A1 and A2), of auxiliaries and additives such as
a) catalysts,
b) surface-active additives,
c) pigments or flame retardants, A5 0 to 10 parts by weight, preferably 0 to 5 parts by weight (based on the sum total of the parts by weight of components A1 and A2), of compounds having hydrogen atoms reactive toward isocyanates and having a molecular weight of 62-399, with component B comprising polyisocyanates, where the preparation is effected at an index of 50 to 250, preferably 70 to 130, more preferably 75 to 115, and where the stated parts by weight of components A1 to A5 are normalized such that the sum total of the parts by weight of components A1+A2 in the composition adds up to 100.

Component A1

The preparation of component A1 in steps (i), (ii) and (iii) has already been elucidated above in connection with the preparation process for the polyether carbonate polyols.

Component A2

Starting components according to component A2 are conventional polyether polyols. In the context of the invention, conventional polyether polyols refer to compounds that are alkylene oxide addition products of starter compounds with Zerewitinoff-active hydrogen atoms, i.e. polyether polyols having a hydroxyl number to DIN 53240 of $\geq 15$ mg KOH/g to $\leq 80$ mg KOH/g, preferably of $\geq 20$ mg KOH/g to $\leq 60$ mg KOH/g.

Starter compounds having Zerewitinoff-active hydrogen atoms that are used for the conventional polyether polyols usually have functionalities of 2 to 6, preferably of 3, and the starter compounds are preferably hydroxy-functional. Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. The starter compound used is preferably glycerol and/or trimethylolpropane.

Suitable alkylene oxides are, for example, ethylene oxide, propylene oxide, 1,2-butylene oxide or 2,3-butylene oxide and styrene oxide. Preference is given to feeding propylene oxide and ethylene oxide into the reaction mixture individually, in a mixture or successively. If the alkylene oxides are metered in successively, the products produced contain polyether chains having block structures. Products having ethylene oxide end blocks are characterized, for example, by elevated concentrations of primary end groups which impart advantageous isocyanate reactivity to the systems.

Component A3

Water and/or physical blowing agents are used as component A3. Physical blowing agents used are, for example, carbon dioxide and/or volatile organic substances.

Component A4

Auxiliaries and additives are used as component A4, such as
a) catalysts (activators),
b) surface-active additives (surfactants), such as emulsifiers and foam stabilizers, especially those having low emissions, for example products from the Tegostab® LF series,
c) additives such as reaction retardants (for example acidic substances such as hydrochloric acid or organic acyl halides), cell regulators (for example paraffins or fatty alcohols or dimethylpolysiloxanes), pigments, dyes, flame retardants (for example tricresyl phosphate), stabilizers against aging and weathering effects, plasticizers, fungistatic and bacteriostatic substances, fillers (for example barium sulfate, kieselgubr, carbon black or whiting) and separating agents.

These auxiliaries and additives for optional additional use are described, for example, in EP-A 0 000 389, pages 18-21. Further examples of auxiliaries and additives for optional additional use in accordance with the invention and details of the manner of use and mode of action of these auxiliaries and additives are described in Kunststoff-Handbuch [Plastics Handbook], volume VII, edited by G. Oertel, Carl-Hanser-Verlag, Munich, 3rd edition, 1993, for example on pages 104-127.

Preferred catalysts are aliphatic tertiary amines (for example trimethylamine, tetramethylbutanediamine), cycloaliphatic tertiary amines (for example 1,4-diaza[2.2.2]bicyclooctane, aliphatic amino ethers (for example dimethylaminoethyl ether and N,N,N-trimethyl-N-hydroxyethyl-bisaminoethyl ether), cycloaliphatic amino ethers (for example N-ethylmorpholine), aliphatic amidines, cycloaliphatic amidines, urea, derivatives of urea (for example aminoalkylureas; see, for example, EP-A 0 176 013, especially (3-dimethylaminopropylamino)urea), and tin catalysts (for example dibutyltin oxide, dibutyltin dilaurate, tin octoate).

Particularly preferred catalysts are

α) urea, derivatives of urea and/or

β) amines and amino ethers each containing a functional group which reacts chemically with the isocyanate. Preferably, the functional group is a hydroxyl group, a primary or secondary amino group. These particularly preferred catalysts have the advantage of having greatly reduced migration and emission characteristics.

Examples of particularly preferred catalysts include: (3-dimethylaminopropylamino)urea, 2-(2-dimethylaminoethoxy)ethanol, N,N-bis(3-dimethylaminopropyl)-N-isopropanolamine, N,N,N-trimethyl-N-hydroxyethylbisaminoethyl ether and 3-dimethylaminopropylamine.

Component A5

Optionally, compounds having at least two hydrogen atoms reactive toward isocyanate and a molecular weight of 32 to 399 are used as component A5. These are understood to mean compounds having hydroxyl groups and/or amino groups and/or thiol groups and/or carboxyl groups, preferably compounds having hydroxyl groups and/or amino groups, which serve as chain extenders or crosslinkers. These compounds generally have 2 to 8, preferably 2 to 4, hydrogen atoms reactive toward isocyanates. For example, ethanolamine, diethanolamine, triethanolamine, sorbitol and/or glycerol can be used as component A5. Further examples of compounds for component A5 are described in EP-A 0 007 502, pages 16-17.

Component B

Suitable polyisocyanates are aliphatic, cycloaliphatic, araliphatic, aromatic and heterocyclic polyisocyanates, as described, for example, by W. Siefken in Justus Liebigs Annalen der Chemie, 562, pages 75 to 136, for example those of the formula (VIII)

$$Q(NCO)_n, \qquad (VIII)$$

in which n=2-4, preferably 2-3, and

Q is an aliphatic hydrocarbyl radical having 2-18 and preferably 6-10 carbon atoms, a cycloaliphatic hydrocarbyl radical having 4-15 and preferably 6-13 carbon atoms or an araliphatic hydrocarbyl radical having 8-15 and preferably 8-13 carbon atoms.

For example, the polyisocyanates are those as described in EP-A 0 007 502, pages 7-8. Preference is generally given to the readily industrially available polyisocyanates, for example tolylene 2,4- and 2,6-diisocyanate and any desired mixtures of these isomers ("TDI"); polyphenylpolymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which derive from tolylene 2,4- and/or 2,6-diisocyanate or from diphenylmethane 4,4'- and/or 2,4'-diisocyanate. The polyisocyanate used is preferably at least one compound selected from the group consisting of tolylene 2,4- and 2,6-diisocyanate, diphenylmethane 4,4'- and 2,4'- and 2,2'-diisocyanate and polyphenylpolymethylene polyisocyanate ("multiring MDI"); the polyisocyanate used is more preferably a mixture comprising diphenylmethane 4,4'-diisocyanate, diphenylmethane 2,4'-diisocyanate and polyphenylpolymethylene polyisocyanate.

For production of the flexible polyurethane foams, the reaction components are reacted by the one-stage process known per se, often using mechanical equipment, for example that described in EP-A 355 000. Details of processing equipment which is also an option in accordance with the invention are described in Kunststoff-Handbuch, volume VII, edited by Vieweg and flochtlen, Carl-Hanser-Verlag, Munich 1993, for example on pages 139 to 265.

The flexible polyurethane foams can be produced as molded foams or else as slabstock foams. The invention therefore provides a process for producing the flexible polyurethane foams, the flexible polyurethane foams produced by these processes, the flexible slabstock polyurethane foams or molded polyurethane foams produced by these processes, the use of the flexible polyurethane foams for production of moldings and the moldings themselves. The flexible polyurethane foams obtainable according to the invention find the following uses, for example: furniture padding, textile inserts, mattresses, automobile seats, headrests, armrests, sponges and construction elements.

The index indicates the percentage ratio of the amount of isocyanate actually used to the stoichiometric amount of isocyanate groups (NCO) amount, i.e. that calculated for the conversion of the OH equivalents.

$$\text{Index}=[(\text{amount of isocyanate used}):(\text{amount of isocyanate calculated})]*100 \qquad (IX)$$

EXAMPLES

Methods:

Apparent density was determined to DIN EN ISO 3386-1-98.

Indentation hardness was determined to DIN EN ISO 3386-1-98 (at 40% deformation and 4th cycle).

Tensile strength and elongation at break were determined to DIN EN ISO 1798.

The compression sets CS 50% and CS 75% were determined to DIN EN ISO 1856-2001-03 at 50% and 75% compression respectively.

The compression set CS 90%/22 h/70° C. was determined to DIN EN ISO 1856-2008 at 90% compression.

OH Number:

The OH numbers were determined by the method of DIN 53240.

Viscosity:

The viscosities were determined by means of a rotary viscometer (Physica MCR 51, manufacturer: Anton Paar) at a shear rate of 5 s$^{-1}$ by the method of DIN 53018.

GPC:

The number-average molecular weight $M_n$ and the weight-average molecular weight $M_w$, and also the polydispersity ($M_w/M_n$), of the products was determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 lam; RID detector).

Polystyrene samples of known molar mass were used for calibration.

Primary OH groups:

Determination of the molar proportion of the primary OH groups: by means of $^1$H NMR (Bruker DPX 400, deuterochloroform):

To determine the content of primary OH groups, the polyol samples were first peracetylated.

This was done using the following peracetylation mixture:

9.4 g of acetic anhydride p.A.

1.6 g of acetic acid p.A.

100 mL of pyridine p.A.

For the peracetylation reaction, 10 g of polyol (polyether carbonate polyol or polyether polyol) were weighed into a 300 mL flanged Erlenmeyer flask. The volume of peracetylation mixture was guided by the OH number of the polyol to be peracetylated, rounding the OH number of the polyol up to the next multiple of 10 (based in each case on 10 g of polyol); for every 10 mg KOH/g, 10 mL of peracetylation mixture are then added. For example, 50 mL of peracetylation mixture were correspondingly added to the sample of 10 g of a polyol having an OH number=45.1 mg KOH/g.

After the addition of glass boiling chips, the flanged Erlenmeyer flask was provided with a riser tube (air condenser) and the sample was boiled under gentle reflux for 75 min. The sample mixture was then transferred into a 500 mL round-bottom flask, and volatile constituents (essentially pyridine, acetic acid and excess acetic anhydride) were distilled off at 80° C. and 10 mbar (absolute) over a period of 30 min. The distillation residue was then admixed three times with 100 mL each time of cyclohexane (toluene was used as an alternative in the cases in which the distillation residue did not dissolve in cyclohexane), and volatile constituents were removed each time at 80° C. and 400 mbar (absolute) for 15 min. Subsequently, volatile constituents of the sample were removed at 100° C. and 10 mbar (absolute) for one hour.

To determine the molar proportions of primary and secondary OH end groups in the polyol, the sample thus prepared was dissolved in deuterated chloroform and analyzed by means of $^1$H NMR (from Broker, DPX 400, 400 MHz, zg30 pulse program, wait time dl: 10 s, 64 scans). The relevant resonances in the $^1$H NMR (relative to TMS=0 ppm) are as follows:

Methyl signal of a peracetylated secondary OH end group: 2.04 ppm

Methyl signal of a peracetylated primary OH end group: 2.07 ppm

The molar proportion of secondary and primary OH end groups is then found as follows:

Proportion of secondary OH end groups (CH—OH) =A(2.04)/(A(2.04)+A(2.07))*100%    (X)

Proportion of primary OH end groups (CH2-OH)=A (2.07)/(A(2.04)+A(2.07))*100%    (XI)

In the formulae (X) and (XI), A represents the area of the resonance at 2.04 ppm or 2.07 ppm.

$CO_2$ Content in the Polyether Carbonate Polyol:

The proportion of incorporated $CO_2$ in the resulting polyether carbonate polyol and the ratio of propylene carbonate to polyether carbonate polyol were determined by means of $^1$H NMR (from Broker, DPX 400, 400 MHz, zg30 pulse program, wait time dl: 10 s, 64 scans). Each sample was dissolved in deuterated chloroform. The relevant resonances in the $^1$H NMR (relative to TMS=0 ppm) are as follows:

Cyclic carbonate (which was formed as a by-product) with resonance at 4.5 ppm, carbonate resulting from carbon dioxide incorporated in the polyether carbonate polyol with resonances at 5.1 to 4.8 ppm, unreacted PO with resonance at 2.4 ppm, polyether polyol (i.e. without incorporated carbon dioxide) with resonances at 1.2 to 1.0 ppm, the octane-1,8-diol incorporated as starter molecule (if present) with a resonance at 1.6 to 1.52 ppm.

The mole fraction of the carbonate incorporated in the polymer in the reaction mixture is calculated as follows by formula (XII), using the following abbreviations:

A(4.5)=area of the resonance at 4.5 ppm for cyclic carbonate (corresponding to a hydrogen atom)

A(5.1-4.8)=area of the resonance at 5.1-4.8 ppm for polyether carbonate polyol and a hydrogen atom for cyclic carbonate A(2.4)=area of the resonance at 2.4 ppm for free unreacted PO A(1.2-1.0)=area of the resonance at 1.2-1.0 ppm for polyether polyol A(1.6-1.52)=area of the resonance at 1.6 to 1.52 ppm for octane-1,8-diol (starter), if present Taking account of the relative intensities, conversion was effected by the following formula (XII) for carbonate bound in polymer form ("linear carbonate" LC) in the reaction mixture in mol %:

$$LC = \frac{A(5.1-4.8) - A(4.5)}{A(5.1-4.8) + A(2.4) + 0.33 * A(1.2-1.0) + 0.25 * A(1.6-1.52)} * 100 \quad (XII)$$

The proportion by weight (in % by weight) of polymer-bound carbonate (LC') in the reaction mixture was calculated by formula (XIII):

$$LC = \frac{[A(5.1-4.8) - A(4.5)] * 102}{D} * 100\% \quad (XIII)$$

where the value of D ("denominator" D) is calculated by formula (XIV):

$D=[A(5.1–4.8)–A(4.5)]*102+A(4.5*102+A(2.4)*58+ 0.33*A(1.2–1.0)&*58+0.25&A(1.6–1.52)*146$    (XIV)

The factor of 102 results from the sum total of the molar masses of $CO_2$ (molar mass 44 g/mol) and of propylene oxide (molar mass 58 g/mol), the factor of 58 results from the molar mass of propylene oxide and the factor of 146 results from the molar mass of the octane-1,8-diol starter used (if present).

The proportion by weight (in % by weight) of cyclic carbonate (CC') in the reaction mixture was calculated by formula (XV):

$$CC' = \frac{A(4.5) * 102}{D} * 100\% \quad (XV)$$

where the value of D is calculated by formula (XIV).

In order to calculate the composition based on the polymer content (consisting of polyether polyol which has been formed from starter and propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were eliminated by calculation. The proportion by weight of the repeat carbonate units in the polyether carbonate polyol was converted to a proportion by weight of carbon dioxide by means of a factor $F=44/(44+58)$. The proportion of the $CO_2$ content in the polyether carbonate polyol is normalized to the proportion of the polyether carbonate polyol molecule which has been formed in the copolymerization and any activation steps in the presence of $CO_2$ (i.e. the proportion of the polyether carbonate polyol molecule which results from the starter (octane-1,8-diol, if present) and from the reaction of the starter with epoxide which has been added under $CO_2$-free conditions was not taken into account here).

Raw Materials Used:

The DMC catalyst used in all the examples was DMC catalyst prepared according to example 6 in WO 01/80994 A1.

Cyclic propylene carbonate: from Acros

A. Preparation of Precursors in Step (i)

Polyether Carbonate Polyol Precursor A:

A 50 liter pressure reactor having a gas metering unit was initially charged with 9.5 g of DMC catalyst and 10 680 g of a trifunctional poly(oxypropylene)polyol having OH number=237 mg KOH/g as starter. The reactor was heated up to 130° C. and inertized by three times evacuating to 200 mbar (absolute) and repeatedly charging with nitrogen. At 130° C. and in the absence of $CO_2$, 1310 g of propylene oxide were metered rapidly into the reactor. The onset of the reaction was perceptible by a temperature peak ("hotspot") and by a pressure drop to about the starting pressure (about 1 bar). After the first pressure drop, a further 880 g of PO and then 740 g of PO were metered in rapidly, which again resulted in a temperature peak and a pressure drop each time. After the reactor had been charged with 54 bar (absolute) of $CO_2$, 1330 g of PO were metered in quickly, which again resulted in a temperature peak. At the same time, the pressure of carbon dioxide $CO_2$ started to fall. The pressure was regulated such that the new $CO_2$ was added when the value fell below the target. Only thereafter was the remaining propylene oxide (27 360 g) pumped continuously into the reactor at about 7.0 kg/h, while the temperature was lowered to 107° C. within about 30 min. After the addition of PO had ended, stirring was continued at reaction temperature and the above-specified pressure for about another 60 minutes. By thin-film evaporation, volatile constituents were finally removed from the product. Product properties:

OH number: 58.3 mg KOH/g
Viscosity (25° C.): 4020 mPas
CO2 content: 14.0% by weight.

Polyether Carbonate Polyol Precursor B:

A 50 liter pressure reactor having a gas metering unit was initially charged with 9.5 g of DMC catalyst and 10 680 g of a trifunctional poly(oxypropylene)polyol having OH number=237 mg KOH/g as starter. The reactor was heated up to 130° C. and inertized by three times evacuating to 200 mbar (absolute) and repeatedly charging with nitrogen. At 130° C. and in the absence of $CO_2$, 1310 g of propylene oxide were metered rapidly into the reactor. The onset of the reaction was perceptible by a temperature peak ("hotspot") and by a pressure drop to about the starting pressure (about 1 bar). After the first pressure drop, a further 880 g of PO were metered in rapidly, which again resulted in a temperature peak and a pressure drop each time. After the reactor had been charged with 54 bar (absolute) of $CO_2$, 1330 g of PO were metered in quickly, which again resulted in a temperature peak. At the same time, the pressure of carbon dioxide $CO_2$ started to fall. The pressure was regulated such that the new $CO_2$ was added when the value fell below the target. Only thereafter was the remaining propylene oxide (27 360 g) pumped continuously into the reactor at about 7.0 kg/h, while the temperature was lowered to 104° C. within about 40 min. After the addition of PO had ended, stirring was continued at reaction temperature and the above-specified pressure for about another 60 minutes. By thin-film evaporation, volatile constituents were finally removed from the product.

Product Properties:
OH number: 56.4 mg KOH/g
Viscosity (25° C.): 7265 mPas
CO2 content: 15.8% by weight.

Polyether Polyol Precursor A:

A 2 liter stainless steel pressure reactor was initially charged with 362 g of a trifunctional poly(oxypropylene) polyol with OH number=237 mg KOH/g and 0.28 g of DMC catalyst under nitrogen, and then heated to 130° C. After nitrogen stripping at 0.1 bar (absolute) for 30 min, the reactor was cooled to 105° C. and 1038 g of propylene oxide were metered into the reactor at this temperature while stirring (800 rpm) within 110 min. After further reaction for 45 min, volatile constituents were distilled off under reduced pressure at 90° C. for 30 minutes and then the reaction mixture was cooled to room temperature.

Product Properties:
OH number: 57.9 mg KOH/g
Viscosity (25° C.): 553 mPas

B. Conversion of the Precursors in Steps (ii) and (iii)

Example 1: Preparation of Polyether Carbonate Polyol PECP-1 Having a High Proportion of Primary OH Groups Step (ii)

A 2 liter stainless steel pressure reactor was initially charged with 660 g of the polyether carbonate polyol precursor A and 0.442 g of DMC catalyst under nitrogen, and heated to 130° C. Stripping was accomplished by introducing nitrogen into the reaction mixture at 130° C. for a period of 30 min and simultaneously applying a reduced pressure (in absolute terms), such that a reduced pressure of 0.1 bar (absolute) was established in the stainless steel pressure reactor. Subsequently, nitrogen was used to establish a reactor pressure of 2.8 bar (absolute).

Step (ii-1): Then, at 130° C., a mixture of 39.6 g of ethylene oxide and 26.4 g of propylene oxide was first metered into the reactor while stirring (800 rpm) within 15 min.

Step (ii-2): At 130° C., a mixture of 52.8 g of ethylene oxide and 13.2 g of propylene oxide was then metered into the reactor while stirring (800 rpm) within 15 min.

Step (iii):

Finally, another 92.4 g of ethylene oxide were metered into the stainless steel pressure reactor at 130° C. and 800 rpm within 30 min, and the pressure in the reactor at the end of the metered addition was 4.7 bar (absolute). After further reaction for 45 min, volatile constituents were distilled off under reduced pressure at 50 mbar (absolute) and 90° C. for 30 minutes and then the reaction mixture was cooled to room temperature.

Product Properties:
OH number: 41.3 mg KOH/g
Polydispersity: 1.14
Primary OH groups: 65%

Comparative Example 2: Preparation of Polyether Polyol PET-1 Having a High Proportion of Primary OH Groups Comparative example 2 was conducted in an analogous manner to example 1, except that polyether carbonate polyol precursor A was exchanged for polyether polyol precursor A. Product properties:
OH number: 42.8 mg KOH/g
Polydispersity: 1.22
Primary OH: 63%

Example 3: Preparation of Polyether Carbonate Polyol PECP-2 Having a High Proportion of Primary OH Groups in the Presence of Cyclic Propylene Carbonate as Solvent Step (ii)

A 2 liter stainless steel pressure reactor was initially charged with 400 g of the polyether carbonate polyol precursor A under nitrogen, and heated to 130° C. Stripping was accomplished by introducing nitrogen into the reaction mixture at 130° C. for a period of 30 min and simultaneously applying a reduced pressure (in absolute terms), such that a reduced pressure of 0.1 bar (absolute) was established in the stainless steel pressure reactor. Subsequently, 26 g of cyclic propylene carbonate were added. Subsequently, the pressure in the stainless steel pressure reactor was reduced to 0.1 bar (absolute) and then it was charged with 3.0 bar (absolute) of nitrogen, and this sequence of evacuation and pressurization was repeated twice more. Then nitrogen was used to establish a reactor pressure of 3.0 bar (absolute).

Step (ii-1): At 130° C., a mixture of 22.3 g of ethylene oxide and 14.9 g of propylene oxide was then first metered into the reactor while stirring (800 rpm) within 10 min.

Step (ii-2): At 130° C., a mixture of 29.7 g of ethylene oxide and 7.4 g of propylene oxide was then metered into the reactor while stirring (800 rpm) within 10 min.

Step (iii):

Finally, another 52.0 g of ethylene oxide were metered into the stainless steel pressure reactor at 130° C. and 800 rpm within 25 min, and the pressure in the reactor at the end of the metered addition was 4.2 bar (absolute). After further reaction for 30 min, volatile constituents and solvent were distilled off under reduced pressure at 50 mbar (absolute) and 130° C. for 60 minutes and then the reaction mixture was cooled to room temperature.

Product Properties:
OH number: 42.1 mg KOH/g
Polydispersity: 1.11
Primary OH: 59%

Comparative Example 4: Preparation of Polyether Polyol PET-2 Having a High Proportion of Primary OH Groups in the Presence of Cyclic Propylene Carbonate as Solvent Comparative example 4 was conducted in an analogous manner to example 3, except that polyether carbonate polyol precursor A was exchanged for polyether polyol precursor A. Product properties:
OH number: 41.0 mg KOH/g
Polydispersity: 1.20
Primary OH: 63%

Conclusion:

A comparison of example 1 with comparative example 2 and of example 3 with comparative example 4 shows that use of a polyether carbonate polyol precursor gave narrower molar mass distributions (lower polydispersities) than use of corresponding polyether polyol precursors.

Example 5: Preparation of Polyether Carbonate Polyol PECP-3 Having Primary OH Groups in the Presence of Cyclic Propylene Carbonate as Solvent Step (ii)

A 2 liter stainless steel pressure reactor was initially charged with 660 g of the polyether carbonate polyol precursor B under nitrogen, and heated to 130° C. Stripping was accomplished by introducing nitrogen into the reaction mixture at 130° C. for a period of 30 min and simultaneously applying a reduced pressure (in absolute terms), such that a reduced pressure of 0.1 bar (absolute) was established in the stainless steel pressure reactor. Subsequently, 40 g of cyclic propylene carbonate were added. Subsequently, the pressure in the stainless steel pressure reactor was reduced to 0.1 bar (absolute) and then it was charged with 3.0 bar (absolute) of nitrogen, and this sequence of evacuation and pressurization was repeated twice more. Then nitrogen was used to establish a reactor pressure of 3.0 bar (absolute).

Step (ii-1): Then, at 130° C., a mixture of 25.5 g of ethylene oxide and 17.0 g of propylene oxide was first metered into the reactor while stirring (800 rpm) within 15 min.

Step (ii-2): At 130° C., a mixture of 33.9 g of ethylene oxide and 8.5 g of propylene oxide was then metered into the reactor while stirring (800 rpm) within 15 min.

Step (iii):

Finally, another 59.4 g of ethylene oxide were metered into the stainless steel pressure reactor at 130° C. and 800 rpm within 30 min, and the pressure in the reactor at the end of the metered addition was 4.6 bar (absolute). After further reaction for 45 min, volatile constituents and solvent were distilled off under reduced pressure at 50 mbar (absolute) and 130° C. for 60 minutes and then the reaction mixture was cooled to room temperature.

Product Properties:
OH number: 43.2 mg KOH/g
Polydispersity: 1.26
Primary OH: 51%

C. Production of Flexible Polyurethane Foams

C.1 Materials and Abbreviations Used

The materials and abbreviations used have the following meanings and sources: Tegostab® B 8681: formulation of organo-modified polysiloxanes, from Evonik Goldschmidt.

Tegostab® B 8715LF: formulation of organo-modified polysiloxanes, from Evonik Goldschmidt.

PET-3: Polyether polyol having an OH number of about 28 mg KOH/g, prepared by means of KOH-catalyzed addition of propylene oxide and ethylene oxide in a weight ratio of 85 to 15 using a mixture of glycerol and sorbitol as starter compounds, having about 85 mol % of primary OH groups and containing 8.6% by weight of filler (copolymer essentially formed from styrene and acrylonitrile).

PET-4: Polyether polyol having an OH number of about 28 mg KOH/g, prepared by means of KOH-catalyzed addition of propylene oxide and ethylene oxide in a weight ratio of 85 to 15 using glycerol as starter compound, having about 85 mol % of primary OH groups.

PET-5: Polyether polyol having an OH number of 37 mg KOH/g, prepared by means of KOH-catalyzed addition of propylene oxide and ethylene oxide in a weight ratio of 27 to 73 using glycerol as starter compound.

Amine 1: amine catalyst (diazabicyclo[2.2.2]octane, 33% by weight in dipropylene glycol).

Amine 2: amine catalyst (bis(dimethylaminoethyl) ether, 70% by weight in dipropylene glycol).

Amine 3: N,N-bis(3-dimethylaminopropyl)-N-isopropanolamine.

Amine 4: amine catalyst, Dabco® NE 300, from Air Products, Hamburg, Germany.

Urea solution (50% $H_2O$): solution of urea in water (50% by weight).

Sn cat.: tin(II) octoate

MDI 1: mixture containing 57% by weight of diphenylmethane 4,4'-diisocyanate, 25% by weight of diphenylmethane 2,4'-diisocyanate and 18% by weight of polyphenylpolymethylene polyisocyanate ("multiring MDI"), having an NCO content of 32.5% by weight.

TDI 1: mixture of 80% by weight of tolylene 2,4-diisocyanate and 20% by weight of tolylene 2,6-diisocyanate.

C.2 Flexible Slabstock Polyurethane Foams

In the manner of processing by the one-stage process, which is customary for the production of polyurethane foams, the feedstocks listed in the examples in table 1 below were reacted with one another.

The resultant flexible slabstock polyurethane foams were subjected to a visual assessment. The classification of the flexible slabstock polyurethane foams ("Foam assessment") was made on a scale of coarse—average—fine. A "coarse" classification here means that the foam has fewer than about 5 cells per cm. An "average" classification means that the foam has more than about 5 cells per cm and fewer than about 12 cells per cm, and a "fine" classification means that the foam has more than about 12 cells per cm.

The classification of the foam quality of the flexible slabstock polyurethane foams in terms of cell structure was made on a scale of poor—average—good. A "poor" classification here means that the foam does not have a homogeneous cell structure and/or has visible defects. An "average" classification means that the foam has a mainly homogeneous cell structure with only few visible defects and a "good" classification means that the foam has a homogeneous cell structure with no visible defects.

TABLE 1

Production and assessment of the flexible slabstock polyurethane foams

| | | Example | | | | | |
|---|---|---|---|---|---|---|---|
| | | 6*) (blank test) | 7 | 8*) | 9 | 10*) | 11 |
| Component A: | | | | | | | |
| PET-3 | [pts. by wt.] | 96.55 | 77.24 | 77.24 | 77.24 | 77.24 | 77.24 |
| PECP-1 (from ex. 1) | [pts. by wt.] | | 19.31 | — | — | — | — |
| PET-1 (from comp. ex. 2) | [pts. by wt.] | | — | 19.31 | — | — | — |
| PECP-2 (from ex. 3) | [pts. by wt.] | | — | — | 19.31 | — | — |
| PET-2 (from comp. ex. 4) | [pts. by wt.] | | — | — | — | 19.31 | — |
| PECP-3 (from ex. 5) | [pts. by wt.] | | — | — | — | — | 19.31 |
| Water (added) | [pts. by wt.] | 1.82 | 1.82 | 1.82 | 1.82 | 1.82 | 1.82 |
| Tegostab0 B 8681 | [pts. by wt.] | 0.39 | 0.39 | 0.39 | 0.39 | 0.39 | 0.39 |
| Amine 1 | [pts. by wt.] | 0.16 | 0.16 | 0.16 | 0.16 | 0.16 | 0.16 |
| Amine 2 | [pts. by wt.] | 0.05 | 0.05 | 0.05 | 0.05 | 0.05 | 0.05 |
| Urea solution (50% H2O): | [pts. by wt.] | 0.39 | 0.39 | 0.39 | 0.39 | 0.39 | 0.39 |
| Diethanolamine | [pts. by wt.] | 0.48 | 0.48 | 0.48 | 0.48 | 0.48 | 0.48 |
| Sn cat. | [pts. by wt.] | 0.16 | 0.16 | 0.16 | 0.16 | 0.16 | 0.16 |
| Component B: | | | | | | | |
| TDI 1 | [MR] | 29.0 | 31.1 | 31.1 | 31.1 | 31.1 | 31.1 |
| Index | | 110 | 110 | 110 | 110 | 110 | 110 |
| Results: | | | | | | | |
| Cream time | [s] | 10 | 10 | 10 | 10 | 10 | 11 |
| Rise time | [s] | 90 | 85 | collapsed | 95 | collapsed | 90 |
| Foam assessment | | fine | fine | | Fine | | Fine |
| Cell structure | | good | good | | Good | | Good |
| Apparent density | [kg/m³] | 43.5 | 44.1 | | 42.9 | | 41.5 |
| Tensile strength | [kPa] | 77 | 82 | | 75 | | 90 |

TABLE 1-continued

Production and assessment of the flexible slabstock polyurethane foams

| | | Example | | | | |
|---|---|---|---|---|---|---|
| | 6*) (blank test) | 7 | 8*) | 9 | 10*) | 11 |
| Elongation at break [%] | 96 | 86 | | 99 | | 114 |
| Indentation hardness [kPa] | 4.6 | 5.1 | | 4.3 | | 4.0 |
| CS 90%/22 h/70° C. [%] | 4.2 | 8.3 | | 5.0 | | 4.8 |

Abbreviations:
*) = comparative example;
pts. by wt. = parts by weight;
MR = weight ratio of component A to component B at the given index and based on 100 parts by weight of component A.

The inventive flexible slabstock polyurethane foam (example 7), in which the polyether carbonate polyol PECP-1 from example 1 was processed, had good foamability with a standard HR foam formulation. In contrast, it was not possible to produce a suitable foam using the polyether polyol PET-1 (comparative example 8). The foam collapsed.

The inventive flexible slabstock polyurethane foam (example 9), in which the polyether carbonate polyol PECP-2 from example 3 was processed, had good foamability with a standard HR foam formulation. In contrast, it was not possible to produce a suitable foam using the polyether polyol PET-2 (comparative example 10). The foam collapsed.

Example 11, using the polyether carbonate polyol PECP-3 from example 5, gave a flexible slabstock foam having a very good level of properties with impeccable processability.

The processability of the inventive polyether carbonate polyols to give flexible slabstock foams (examples 7, 9 and 11) is at a good level: On partial exchange of the polyether polyol PET-3 for a polyether carbonate polyol (PECP-1, PECP-2 or PECP-3), there is no need to adjust the further constituents of the polyol formulation (additives) in terms of type and/or amount in order to achieve impeccable processibility, and the mechanical properties of the resulting flexible slabstock foams (examples 7, 9 and 11) have a level comparable to the blank test (comparative example 6).

C.3 Flexible Molded Polyurethane Foams

In the manner of processing by the one-stage process, which is customary for the production of flexible molded polyurethane foams, the feedstocks listed in the examples in table 2 below were reacted with one another. The reaction mixture was introduced into a metal mold of volume 9.7 L which had been heated to 60° C., and demolded after 5 min. The amount of the raw materials used was chosen so as to result in a calculated molding density of about 57 kg/m3. Table 2 states the molding density actually obtained, which was determined to DIN EN ISO 3386-1-98.

TABLE 2

Production and assessment of the flexible molded polyurethane foams

| | | 12*) (blank test) | 13 | 14*) | 15 |
|---|---|---|---|---|---|
| Component A | | | | | |
| PET-4 | [pts. by wt.] | 92.24 | 73.32 | 73.32 | 73.32 |
| PET-5 | [pts. by wt.] | 2.37 | 2.37 | 2.37 | 2.37 |
| PECP-1 (from ex. 1) | [pts. by wt.] | | 18.92 | | |
| PET-1 (from comp. ex. 2) | [pts. by wt.] | | | 18.92 | |
| PECP-3 (from ex. 5) | [pts. by wt.] | | | | 18.92 |
| Water (added) | [pts. by wt.] | 3.03 | 3.03 | 3.03 | 3.03 |
| Diethanolamine | [pts. by wt.] | 0.95 | 0.95 | 0.95 | 0.95 |
| Tegostab B 8715 LF | [pts. by wt.] | 0.95 | 0.95 | 0.95 | 0.95 |
| Amine 3 | [pts. by wt.] | 0.39 | 0.39 | 0.39 | 0.39 |
| Amine 4 | [pts. by wt.] | 0.09 | 0.09 | 0.09 | 0.09 |
| Component B: | | | | | |
| MDI 1 | [MR] | 56.19 | 56.94 | 56.94 | 57.16 |
| Index | | 100 | 100 | 100 | 100 |
| Results: | | | | | |
| Apparent density | [kg/m³] | 57.3 | 56.7 | collapsed | 56.3 |
| Indentation hardness | [kPa] | 8.10 | 7.16 | | 7.85 |
| Tensile strength | [kPa] | 148 | 150 | | |
| Elongation at break | [%] | 90 | 102 | | |
| CS 50%/22 h/70° C. | [%] | 5.9 | 6.8 | | |
| CS 75%/22 h/70° C. | [%] | 7.8 | 8.8 | | |

Abbreviations:
*) = comparative example; pts. by wt. = parts by weight; MR = weight ratio of component A to component B at the given index and based on 100 parts by weight of component A.

The inventive polyether carbonate polyols can be processed without any problem to give molded flexible polyurethane foams, in contrast to comparative example 14 which led to collapse when processed to give a molded flexible foam. The inventive flexible molded polyurethane foams from examples 13 and 15 have a good level of properties.

The processibility of the inventive polyether carbonate polyols to give flexible molded polyurethane foams (examples 13 and 15) is at a good level: On partial exchange of polyether polyol (here: mixture of PET-4 and PET-5) for a polyether carbonate polyol (PECP-1 or PECP-3), there is no need to adjust the further constituents of the polyol formulation (additives) in terms of type and/or amount in order to achieve impeccable processibility, and the mechanical properties of the resulting flexible molded foams (examples 13 and 15) have a level comparable to the blank test (comparative example 12).

What is claimed is:

1. A process for preparing polyether carbonate polyol comprising:
   (i) adding:
      (a) carbon dioxide and propylene oxide;
   onto one or more H-functional starter substance(s) in the presence of at least one DMC catalyst;
   (ii) a reaction mixture obtained from (i);
      (ii-1) is first chain-extended with a mixture comprising propylene oxide (PO) and ethylene oxide (EO) in a PO/EO weight ratio of 90/10 to 20/80 in the presence of at least one DMC catalyst;
      (ii-2) then a resulting mixture is chain-extended with a mixture comprising propylene oxide (PO) and ethylene oxide (EO) in a PO/EO weight ratio of 60/40 to 2/98 in the presence of at least one DMC catalyst;
      wherein (ii) is performed by adding a solvent comprising at least one of cyclic propylene carbonate and cyclic ethylene carbonate; and
   (iii) polyether carbonate polyol resulting from (ii) is chain-extended with ethylene oxide in the presence of at least one DMC catalyst;
   where the proportion by weight of EO in the mixture comprising PO and EO in (ii-2) is higher than the proportion by weight of EO in the mixture comprising PO and EO in (ii-1).

2. The process as claimed in claim 1, wherein, in (i):
   (α) a H-functional starter substance or a mixture of at least two H-functional starter substances and/or a suspension medium is initially charged and any water and/or other volatile compounds are removed by elevated temperature and/or reduced pressure comprising drying, with addition of the DMC catalyst to the H-functional starter substance and/or to the mixture of at least two H-functional starter substances and/or the suspension medium before or after the drying;
   (β) activation is accomplished by adding a portion (based on the total amount of the amount of alkylene oxides used in the activation and copolymerization) of alkylene oxide selected from the group consisting of:
      (a) propylene oxide;
   to a mixture resulting from (α), wherein said adding a portion of alkylene oxide can be effected in optional presence of $CO_2$, in which case a temperature peak comprising a hotspot which occurs because of an exothermic chemical reaction that follows and/or a pressure drop in the reactor can occur, and where (β) for activation can also be effected repeatedly;
   (γ) adding propylene oxide, carbon dioxide and optionally one or more H-functional starter substance(s) to a mixture resulting from (β);
   where at least one H-functional starter substance is added in at least one of (α) and (γ).

3. The process as claimed in claim 1, wherein one or more H-functional starter substances used in (i) are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol and polyether polyols having a molecular weight Mn in a range from 150 to 4500 g/mol and a functionality of 2 to 3.

4. The process as claimed in claim 1, wherein a reaction mixture obtained from (i):
   (ii-1) is first chain-extended with a mixture comprising propylene oxide (PO) and ethylene oxide (EO) in a PO/EO weight ratio of 80/20 to 30/70 in the presence of at least one DMC catalyst; and
   (ii-2) then a resulting mixture is chain-extended with a mixture comprising propylene oxide (PO) and ethylene oxide (EO) in a PO/EO weight ratio of 40/60 to 5/95 in the presence of at least one DMC catalyst.

5. The process as claimed in claim 1, wherein a suspension media is used and comprises 4-methyl-2-oxo-1,3-dioxolane, 1,3-dioxolan-2-one, toluene, xylene, ethylbenzene, chlorobenzene, dichlorobenzene and/or a mixture thereof.

6. The process as claimed in claim 1, wherein (ii-1) and/or (ii-2) are repeated two to ten times.

7. The process as claimed in claim 6, wherein the proportion by weight of EO increases on each repetition of (ii-1) and/or (ii-2).

8. The process as claimed in claim 1, wherein the proportion by weight of EO in the mixture of PO and EO is increased continuously between a starting PO/EO mixing ratio and a final PO/EO mixing ratio, the starting PO/EO mixing ratio corresponding to a PO/EO weight ratio from the weight ratio defined for (ii-1), and the final PO/EO mixing ratio corresponding to a PO/EO weight ratio from the weight ratio defined for (ii-2).

9. The process as claimed in claim 1, wherein a mean length of mixed blocks of PO and EO prepared in (ii-1) or (ii-2) is 1.0 to 20.0 alkylene oxide units, based in each case on one OH group of the polyether carbonate polyol.

10. The process as claimed in claim 1, wherein a mean length of an ethylene oxide block prepared in (iii) is 1 to 30 ethylene oxide units, based in each case on one OH group of the polyether carbonate polyol.

11. A polyether carbonate polyol prepared according to claim 1.

12. A process comprising producing one or more flexible polyurethane foams with a polyol component A comprising a polyether carbonate polyol prepared according to claim 1.

13. A process for producing flexible polyurethane foams having an apparent density to DIN EN ISO 3386-1-98 in a range from ≥10 kg/m³ to ≤150 kg/m³ and an indentation hardness to DIN EN ISO 3386-1-98 in a range from ≥0.5 kPa to ≤20 kPa (at 40% deformation and 4th cycle) comprising reacting:
   component A comprising:
      A1 100 to 10 parts by weight (based on the sum total of the parts by weight of components A1 and A2) of polyether carbonate polyol prepared according to claim 1;

A2 0 to 90 parts by weight (based on the sum total of the parts by weight of components A1 and A2) of conventional polyether polyol;

A3 0.5 to 25 parts by weight (based on the sum total of the parts by weight of components A1 and A2) of water and/or physical blowing agents;

A4 0.05 to 10 parts by weight (based on the sum total of the parts by weight of components A1 and A2) of one or more auxiliaries and additives optionally comprising one or more;
  d) catalysts;
  e) surface-active additives;
  f) pigments or flame retardants;

A5 0 to 10 parts by weight (based on the sum total of the parts by weight of components A1 and A2) of one or more compounds having one or more hydrogen atoms reactive toward isocyanates and having a molecular weight of 62-399;

with component B comprising one or more polyisocyanates;

where the process is effected at an index of 50 to 250, and where parts by weight of:

components A1 to A5 are normalized such that the sum total of the parts by weight of components A1+A2 in said component A adds up to 100.

14. A flexible polyurethane foam having an apparent density to DIN EN ISO 3386-1-98 in a range from $\geq 10$ kg/m$^3$ to $\leq 150$ kg/m$^3$ and an indentation hardness to DIN EN ISO 3386-1-98 in a range from $\geq 0.5$ kPa to $\leq 20$ kPa (at 40% deformation and 4th cycle) obtained by a process as claimed in claim 12.

15. The process as claimed in claim 1, wherein a reaction mixture obtained from (i):
  (ii-1) is first chain-extended with a mixture comprising propylene oxide (PO) and ethylene oxide (EO) in a PO/EO weight ratio of 75/25 to 35/65 in the presence of at least one DMC catalyst; and
  (ii-2) then a resulting mixture is chain-extended with a mixture comprising propylene oxide (PO) and ethylene oxide (EO) in a PO/EO weight ratio of 30/70 to 10/90 in the presence of at least one DMC catalyst.

* * * * *